US009923742B2

(12) United States Patent
Porat

(10) Patent No.: US 9,923,742 B2
(45) Date of Patent: *Mar. 20, 2018

(54) PREAMBLE DESIGN WITHIN WIRELESS COMMUNICATIONS

(71) Applicant: BROADCOM CORPORATION, Irvine, CA (US)

(72) Inventor: Ron Porat, San Diego, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 169 days.

This patent is subject to a terminal disclaimer.

(21) Appl. No.: 14/948,546

(22) Filed: Nov. 23, 2015

(65) Prior Publication Data

US 2016/0080186 A1 Mar. 17, 2016

Related U.S. Application Data

(63) Continuation-in-part of application No. 14/510,313, filed on Oct. 9, 2014, now abandoned, which is a
(Continued)

(51) Int. Cl.
*H04L 27/26* (2006.01)
*H04L 5/00* (2006.01)
(Continued)

(52) U.S. Cl.
CPC ....... *H04L 27/2602* (2013.01); *H04B 7/0689* (2013.01); *H04L 5/0048* (2013.01);
(Continued)

(58) Field of Classification Search
CPC ............. H04L 27/2602; H04L 27/2613; H04L 5/0048; H04L 5/0007; H04L 69/22; H04B 7/0689
(Continued)

(56) References Cited

U.S. PATENT DOCUMENTS 5,278,892 A * 1/1994 Bolliger ................ H04W 36/18
370/331
6,823,488 B1 * 11/2004 Heegard ............... H04L 1/0041
714/786
(Continued)

*Primary Examiner* — Afsar M Qureshi
(74) *Attorney, Agent, or Firm* — Garlick & Markison; Shayne X. Short

(57) ABSTRACT

A wireless communication device (alternatively, device) includes a processor configured to support communications with other wireless communication device(s) and to generate and process signals for such communications. In some examples, the device includes a communication interface and a processor, among other possible circuitries, components, elements, etc. to support communications with other wireless communication device(s) and to generate and process signals for such communications. The device is configured to generate OFDM/A packet(s) that include a signal field (SIG) and a copy of that SIG (e.g., a repeat of the SIG, a repetition of the SIG, a duplicate of the SIG, etc.). In some examples, the copy of the SIG adjacently follows the SIG. Also, in some examples of a OFDM/A packet, the SIG and its copy are based on one communication protocol, standard, and/or recommended practice, and another field therein is based on another communication protocol, standard, and/or recommended practice.

20 Claims, 8 Drawing Sheets

Related U.S. Application Data continuation-in-part of application No. 14/041,225, filed on Sep. 30, 2013, now abandoned, application No. 14/948,546, which is a continuation-in-part of application No. 14/814,991, filed on Jul. 31, 2015, now Pat. No. 9,407,485, which is a continuation of application No. 13/454,021, filed on Apr. 23, 2012, now Pat. No. 9,113,490.

(60) Provisional application No. 62/084,406, filed on Nov. 25, 2014, provisional application No. 62/109,515, filed on Jan. 29, 2015, provisional application No. 62/116,033, filed on Feb. 13, 2015, provisional application No. 62/121,941, filed on Feb. 27, 2015, provisional application No. 62/127,085, filed on Mar. 2, 2015, provisional application No. 62/142,817, filed on Apr. 3, 2015, provisional application No. 61/888,967, filed on Oct. 9, 2013, provisional application No. 61/898,211, filed on Oct. 31, 2013, provisional application No. 61/751,401, filed on Jan. 11, 2013, provisional application No. 61/831,789, filed on Jun. 6, 2013, provisional application No. 61/870,606, filed on Aug. 27, 2013, provisional application No. 61/873,512, filed on Sep. 4, 2013, provisional application No. 61/478,537, filed on Apr. 24, 2011, provisional application No. 61/493,577, filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(51) Int. Cl.
*H04L 29/06* (2006.01)
*H04B 7/06* (2006.01)

(52) U.S. Cl.
CPC .......... *H04L 27/2613* (2013.01); *H04L 69/22* (2013.01); *H04L 5/0007* (2013.01)

(58) Field of Classification Search
USPC .......................................... 370/312
See application file for complete search history.

(56) References Cited

U.S. PATENT DOCUMENTS

| | | | | |
|---|---|---|---|---|
| 2011/0310830 A1* | 12/2011 | Wu | .................. | H04W 72/1289 |
| | | | | 370/329 |
| 2013/0121348 A1* | 5/2013 | Zhang | .................... | H04L 29/06 |
| | | | | 370/474 |
| 2015/0009979 A1* | 1/2015 | Noh | ...................... | H04L 5/0023 |
| | | | | 370/338 |

\* cited by examiner

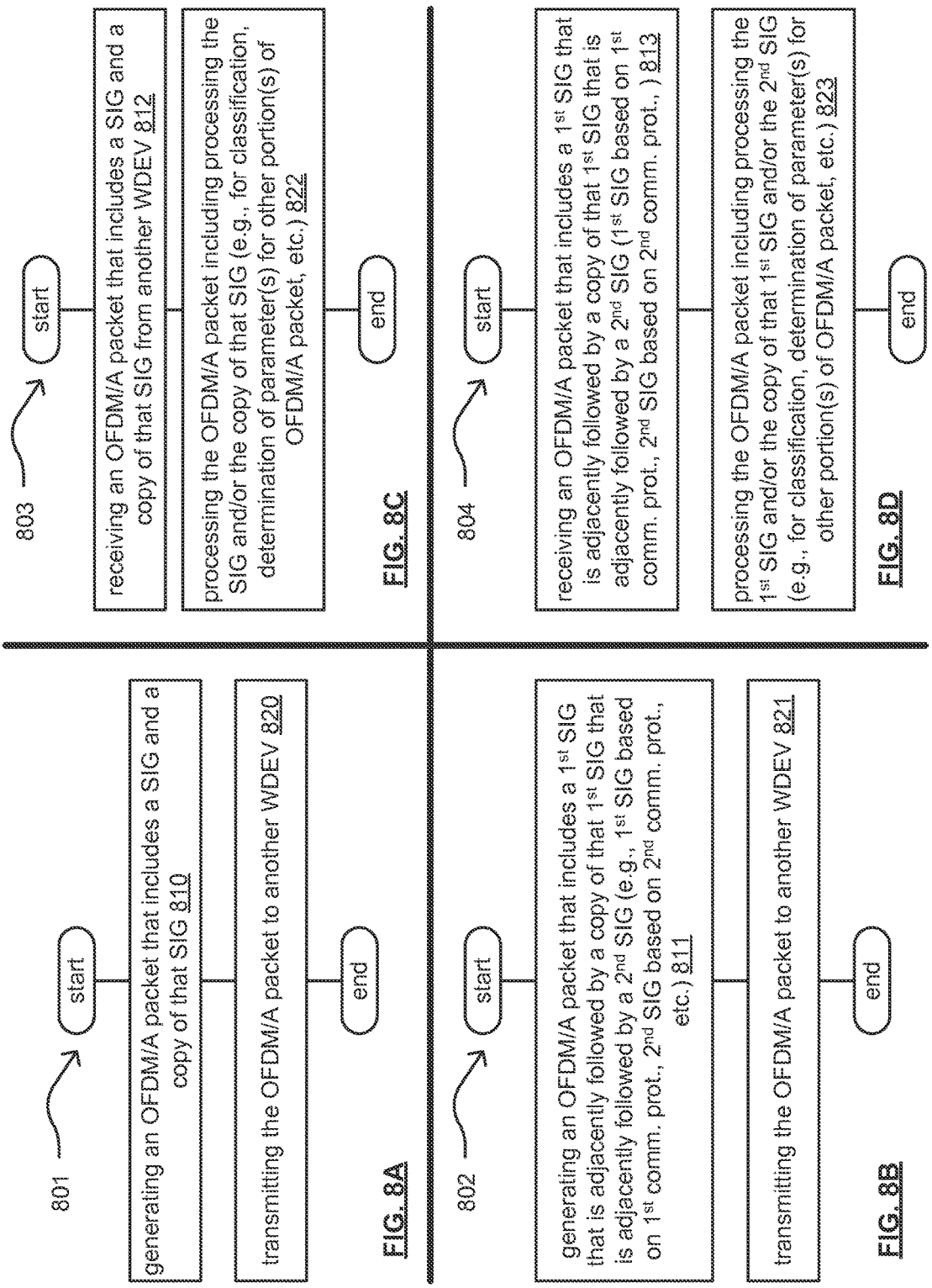

PREAMBLE DESIGN WITHIN WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. § 119(e) to U.S. Provisional Patent App. Ser. No. 62/084,406, entitled "Preamble signal field (SIG) design for use in wireless communications," filed Nov. 25, 2014; U.S. Provisional Patent App. Ser. No. 62/109,515, entitled "Preamble signal field (SIG) design for use in wireless communications," filed Jan. 29, 2015; U.S. Provisional Patent App. Ser. No. 62/116,033, entitled "Preamble signal field (SIG) design for use in wireless communications," filed Feb. 13, 2015; U.S. Provisional Patent App. Ser. No. 62/121,941, entitled "Preamble signal field (SIG) design for use in wireless communications," filed Feb. 27, 2015; U.S. Provisional Patent App. Ser. No. 62/127,085, entitled "Preamble signal field (SIG) design for use in wireless communications," filed Mar. 2, 2015; and U.S. Provisional Patent App. Ser. No. 62/142,817, entitled "Preamble signal field (SIG) design for use in wireless communications," filed Apr. 3, 2015; all of which are hereby incorporated herein by reference in their entirety and made part of the present U.S. Utility Patent Application for all purposes.

CONTINUATION-IN-PART (CIP) PRIORITY CLAIMS, 35 U.S.C. § 120

The present U.S. Utility Patent Application also claims priority pursuant to 35 U.S.C. § 120, as a continuation-in-part (CIP), to the following U.S. Utility Patent Application which is hereby incorporated herein by reference in its entirety and made part of the present U.S. Utility Patent Application for all purposes, U.S. Utility patent application Ser. No. 14/510,313, entitled "Distributed signal fields (SIGs) for use in wireless communications," filed Oct. 9, 2014, which claims priority pursuant to 35 U.S.C. § 119(e) to U.S. Provisional Patent Application No. 61/888,967, entitled "Next generation within single user, multiple user, multiple access, and/or MIMO wireless communications," filed Oct. 9, 2013; U.S. Provisional Patent Application No. 61/898,211, entitled "Next generation within single user, multiple user, multiple access, and/or MIMO wireless communications," filed Oct. 31, 2013; all of which are hereby incorporated herein by reference in their entirety and made part of the present U.S. Utility Patent Application for all purposes.

U.S. Utility patent application Ser. No. 14/510,313, entitled "Distributed signal fields (SIGs) for use in wireless communications," filed Oct. 9, 2014, pending, also claims priority pursuant to 35 U.S.C. § 120, as a continuation-in-part (CIP), to the following U.S. Utility Patent Application which is hereby incorporated herein by reference in its entirety and made part of the present U.S. Utility Patent Application for all purposes, U.S. Utility patent application Ser. No. 14/041,225, entitled "Orthogonal frequency division multiple access (OFDMA) and duplication signaling within wireless communications," filed Sep. 30, 2013, pending, which claims priority pursuant to 35 U.S.C. § 119(e) to U.S. Provisional Patent Application No. 61/751,401, entitled "Next generation within single user, multiple user, multiple access, and/or MIMO wireless communications," filed Jan. 11, 2013; U.S. Provisional Patent Application No. 61/831,789, entitled "Next generation within single user, multiple user, multiple access, and/or MIMO wireless communications," filed Jun. 6, 2013; U.S. Provisional Patent Application No. 61/870,606, entitled "Next generation within single user, multiple user, multiple access, and/or MIMO wireless communications," filed Sep. 27, 2013; U.S. Provisional Patent Application No. 61/873,512, entitled "Orthogonal frequency division multiple access (OFDMA) and duplication signaling within wireless communications," filed Sep. 4, 2013; all of which are hereby incorporated herein by reference in their entirety and made part of the present U.S. Utility Patent Application for all purposes.

The present U.S. Utility Patent Application also claims priority pursuant to 35 U.S.C. § 120, as a continuation-in-part (CIP), to the following U.S. Utility Patent Application which is hereby incorporated herein by reference in its entirety and made part of the present U.S. Utility Patent Application for all purposes, U.S. Utility patent application Ser. No. 14/814,991, entitled "Short training field (STF) for use within single user, multiple user, multiple access, and/or MIMO wireless communications," filed Jul. 31, 2015, pending, which claims priority pursuant to 35 U.S.C. § 120 as a continuation of U.S. Utility application Ser. No. 13/454,021, entitled "Short training field (STF) for use within single user, multiple user, multiple access, and/or MIMO wireless communications," filed Apr. 23, 2012, now issued as U.S. Pat. No. 9,113,490 on Aug. 18, 2015, which claims priority pursuant to 35 U.S.C. § 119(e) to U.S. Provisional Application No. 61/478,537, entitled "Preamble for use within multiple user, multiple access, and/or MIMO wireless communications," filed Apr. 24, 2011; U.S. Provisional Application No. 61/493,577, entitled "Preamble for use within multiple user, multiple access, and/or MIMO wireless communications," filed Jun. 6, 2011; U.S. Provisional Application No. 61/496,153, entitled "Preamble for use within multiple user, multiple access, and/or MIMO wireless communications," filed Jun. 13, 2011; U.S. Provisional Application No. 61/501,239, entitled "Preamble for use within multiple user, multiple access, and/or MIMO wireless communications," filed Jun. 26, 2011; U.S. Provisional Application No. 61/507,955, entitled "Preamble for use within multiple user, multiple access, and/or MIMO wireless communications," filed Jul. 14, 2011; U.S. Provisional Application No. 61/512,363, entitled "Preamble for use within multiple user, multiple access, and/or MIMO wireless communications," filed Jul. 27, 2011; U.S. Provisional Application No. 61/522,608, entitled "Preamble for use within multiple user, multiple access, and/or MIMO wireless communications," filed Aug. 11, 2011; U.S. Provisional Application No. 61/542,602, entitled "Preamble for use within multiple user, multiple access, and/or MIMO wireless communications," filed Oct. 3, 2011; U.S. Provisional Application No. 61/561,722, entitled "Preamble for use within multiple user, multiple access, and/or MIMO wireless communications," filed Nov. 18, 2011; U.S. Provisional Application No. 61/577,597, entitled "Preamble for use within multiple user, multiple access, and/or MIMO wireless communications," filed Dec. 19, 2011; U.S. Provisional Application No. 61/584,142, entitled "Preamble for use within multiple user, multiple access, and/or MIMO wireless communications," filed Jan. 6, 2012; U.S. Provisional Application No. 61/592,514, entitled "Preamble for use within multiple user, multiple access, and/or MIMO wireless communications," filed Jan. 30, 2012; U.S. Provisional Application No. 61/595,616, entitled "Preamble for use within multiple user, multiple access, and/or MIMO wireless communications," filed Feb. 6, 2012; U.S. Provisional Application No. 61/598,293, entitled "Preamble for use within multiple user, multiple access, and/or MIMO wireless communications," filed Feb. 13, 2012; and U.S. Provisional Application No. 61/602,504, entitled "Preamble for use within multiple user, multiple access, and/or MIMO wireless communications," filed Feb. 23, 2012; all of which are hereby incorporated herein by reference in their entirety and made part of the present U.S. Utility Patent Application for all purposes.

INCORPORATION BY REFERENCE

The following U.S. Utility Patent Application is hereby incorporated herein by reference in its entirety and made part of the present U.S. Utility Patent Application for all purposes:

1. U.S. Utility patent application Ser. No. 14/948,604, entitled "Preamble design within wireless communications," filed concurrently on Nov. 23, 2015.

BACKGROUND

Technical Field

The present disclosure relates generally to communication systems; and, more particularly, to signal design and construction within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Certain communication systems may include various wireless communication devices that operate based on multiple communication protocols, standards, and/or recommended practices. The prior art does not provide adequate means by which the various wireless communication devices can generate, distinguish, differentiate, and classify various communications that within such communication systems that may be based on such multiple communication protocols, standards, and/or recommended practices.

BRIEF DESCRIPTION OF THE SEVERAL VIEWS OF THE DRAWINGS

FIG. 8A is a diagram illustrating an embodiment of a method for execution by one or more wireless communication devices.

FIG. 8B is a diagram illustrating another embodiment of a method for execution by one or more wireless communication devices.

FIG. 8C is a diagram illustrating another embodiment of a method for execution by one or more wireless communication devices.

FIG. 8D is a diagram illustrating another embodiment of a method for execution by one or more wireless communication devices.

DETAILED DESCRIPTION

Figure 1:
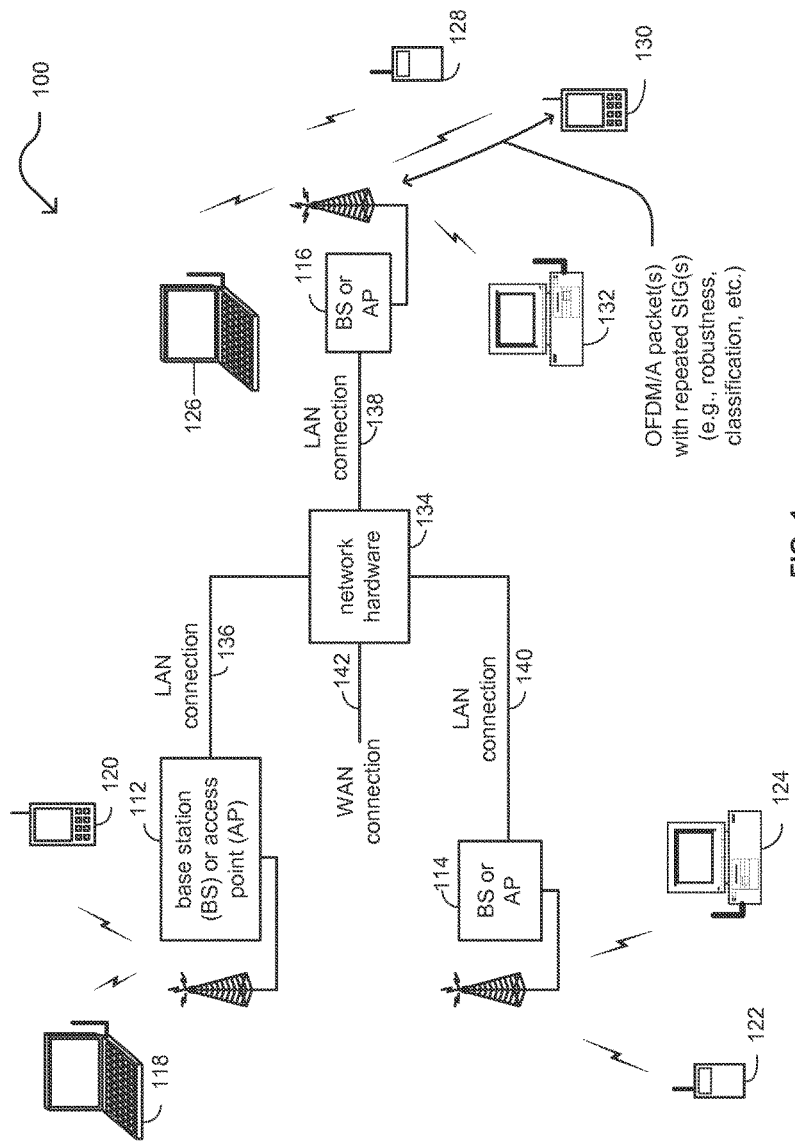
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 3A.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and/or a communication interface to support communications with any other of the wireless communication devices 118-132 and BSs or APs 112-116. In an example of operation, a processor and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processor and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processor (and possibly other possible circuitries, components, elements, etc.) to support communications with other device(s) and to generate and process signals for such communications. The communication interface and/or the processor operate to perform various operations and functions to effectuate such communications (e.g., the communication interface and the processor may be configured to perform certain operation(s) in conjunction with one another, cooperatively, dependently with one another, etc. and other operation(s) separately, independently from one another, etc.).

In an example of operation, a device (e.g., device 130) is configured to generate an orthogonal frequency division multiplexing (OFDM) packet that includes a signal field (SIG) that is adjacently followed by a copy of the SIG that is adjacently followed by at least one other field. Note that general reference to OFDM also includes orthogonal frequency division multiple access (OFDMA), which is a variant of OFDM, and the details of both are described in more detail below.

In some examples, the SIG is based on a first communication protocol, and the at least one other field is based on a second communication protocol that is different than the first communication protocol. In some examples, the first communication protocol is a first IEEE 802.11 communication protocol, and the second communication protocol is a second IEEE 802.11 communication protocol that is a legacy IEEE 802.11 communication protocol version to the first IEEE 802.11 communication protocol. For example, the second IEEE 802.11 communication protocol may be based on IEEE 802.11ax, while the first IEEE 802.11 communication protocol may be based on any prior/legacy version relative to IEEE 802.11ax (e.g., IEEE 802.11a, IEEE 802.11b, IEEE 802.11g, IEEE 802.11n, IEEE 802.11ac, IEEE 802.11ah, IEEE 802.11ag, and/or any other prior/legacy version, etc.).

The device is also configured to transmit the OFDM packet to another wireless communication device (e.g., another one of the WDEVs 118-132 and BSs or APs 112-116).

In another example of operation, a device is configured to generate the OFDM packet to include a short training field (STF) that is adjacently followed by a long training field (LTF) that is adjacently followed by the SIG that is adjacently followed by the copy of the SIG that is adjacently followed by another SIG. In some examples, the STF, the LTF, and the SIG are based on the first communication protocol, and the other SIG is based on the second communication protocol.

In another example of operation, the device is configured to generate the OFDM packet to include a preamble followed by data. In such an example, a first portion of the preamble is based on the first communication protocol and includes the SIG that is adjacently followed by the copy of the SIG, and a second portion of the preamble is based on the second communication protocol.

In another example of operation, the device is configured to generate the OFDM packet including to encode information using a binary convolutional code (BCC) to generate encoded information and to modulate the encoded information using binary phase shift keying (BPSK) modulation to generate the SIG. Various examples of coding, modulation, etc. are described in more detail below.

In another example of operation, the device is configured to generate the OFDM packet including to multiply a different SIG by a Pseudo-Noise (PN) sequence to generate the SIG that is included in the OFDM packet. As such, the copy of the SIG will also have been multiplied by the PN sequence as well.

Figure 2:
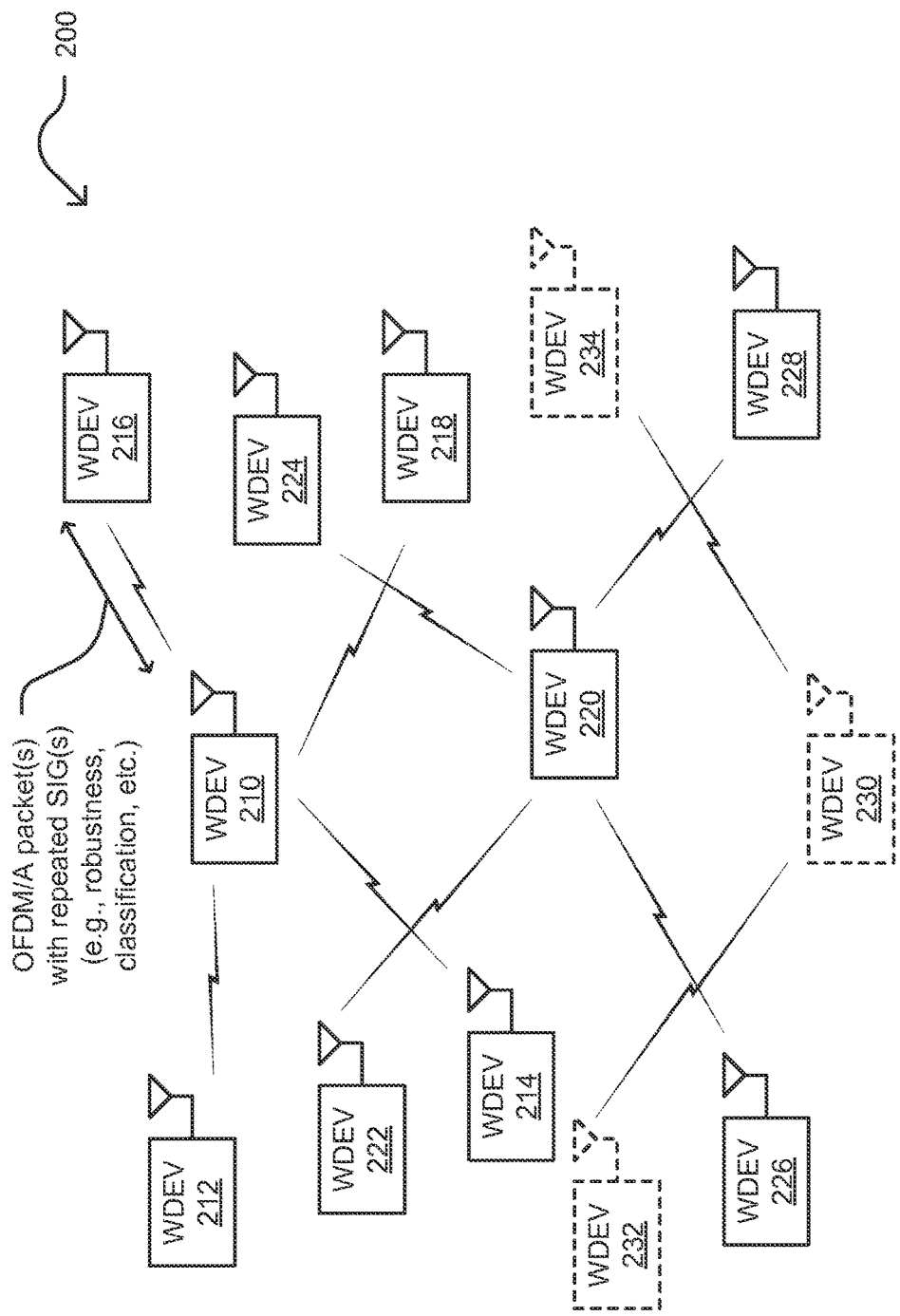
FIG. 2 is a diagram illustrating an embodiment of dense deployment of wireless communication devices.
Figure 3:
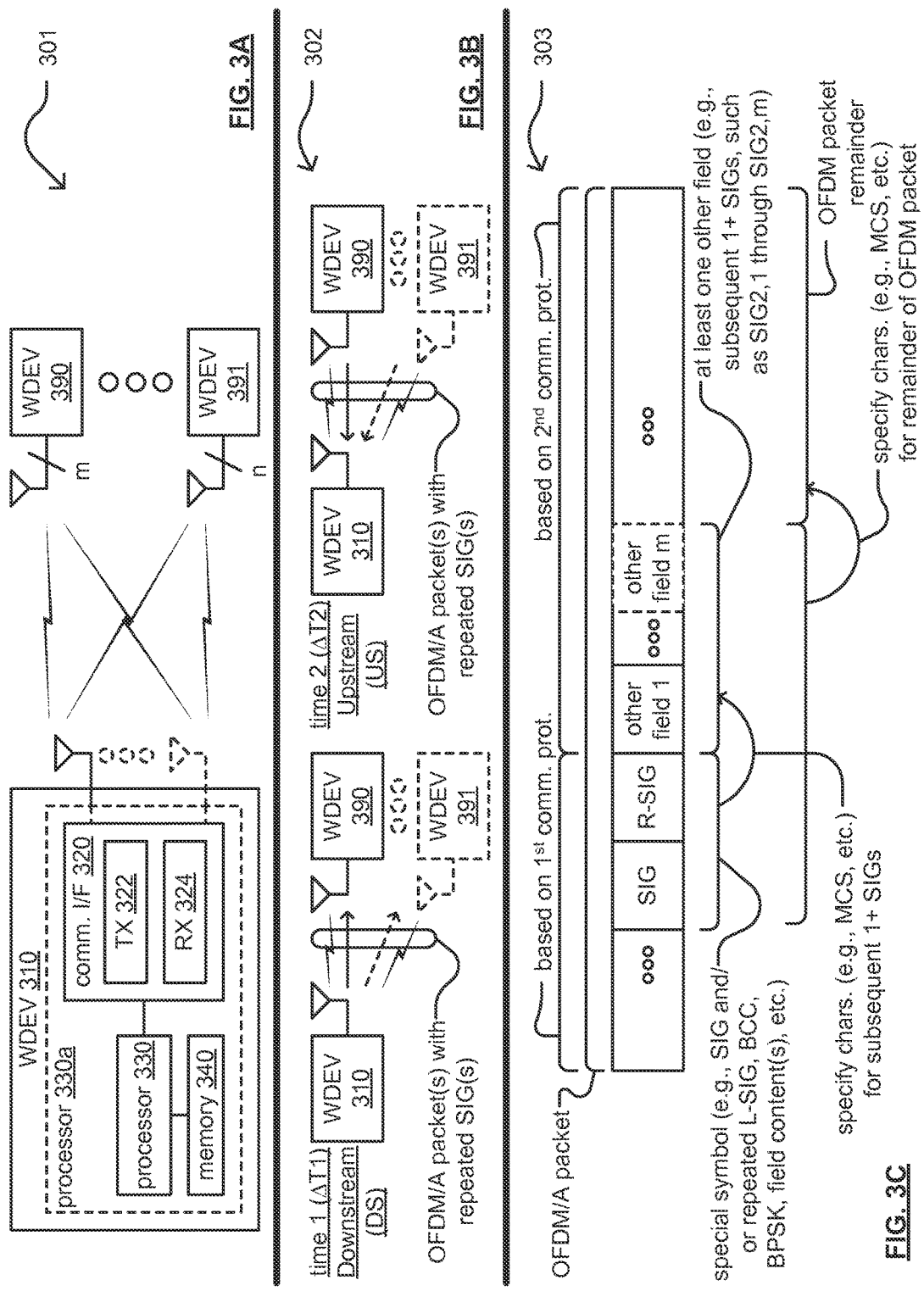
FIG. 3A is a diagram illustrating an example of communication between wireless communication devices.
FIG. 3B is a diagram illustrating another example of communication between wireless communication devices.
FIG. 3C is a diagram illustrating another example of communication between wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation, a device (e.g., WDEV 216) is configured to generate an OFDM packet that includes a signal field (SIG) that is adjacently followed by a copy of the SIG that is adjacently followed by at least one other field. Note that general reference to OFDM also includes orthogonal frequency division multiple access (OFDMA), which is a variant of OFDM, and the details of both are described in more detail below. In some examples, the SIG is based on a first communication protocol, and the at least one other field is based on a second communication protocol that is different than the first communication protocol. The device (e.g., WDEV 216) is also configured to transmit the OFDM packet to another wireless communication device (e.g., WDEV 210).

In another example of operation, a device (e.g., WDEV 216) is configured to generate an OFDM packet that includes a short training field (STF) that is adjacently followed by a long training field (LTF) that is adjacently followed by a first signal field (SIG) that is adjacently followed by a copy of the first SIG that is adjacently followed by a second SIG. In some examples, the STF, the LTF, and the first SIG are based on a first communication protocol, and the second SIG is based on a second communication protocol that is different than the first communication protocol. The device (e.g., WDEV 216) is also configured to transmit the OFDM packet to another wireless communication device (e.g., WDEV 210).

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processor 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit.

Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processor 330, the communication interface 320 (including the TX 322 and/or RX 324 thereof), and/or the memory 340 may be implemented in one or more "processing modules," "processing circuits," "processors," and/or "processing units". Considering one example, one processor 330a may be implemented to include the processor 330, the communication interface 320 (including the TX 322 and/or RX 324 thereof), and the memory 340. Considering another example, two or more processors may be implemented to include the processor 330, the communication interface 320 (including the TX 322 and/or RX 324 thereof), and the memory 340. In such examples, such a "processor" or "processors" is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processor 330 and communication interface 320 configured to perform various operations. In other examples, the device 310 includes processor 330a configured to perform various operations. Generally, such operations include generating, transmitting, etc. signals intended for one or more other devices (e.g., device 390 through 391) and receiving, processing, etc. other signals received for one or more other devices (e.g., device 390 through 391).

In an example of operation, the processor 330a is configured to generate an OFDM packet that includes a signal field (SIG) that is adjacently followed by a copy of the SIG that is adjacently followed by at least one other field. In some examples, the first SIG is based on a first communication protocol (e.g., a newer or newest IEEE 802.11), and the second SIG and the third SIG are based on a second communication protocol that is different than the first communication protocol (e.g., the second communication protocol being any prior, legacy, etc. version of IEEE 802.11 relative to the newer or newest IEEE 802.11). The processor 330a is configured to transmit the OFDM packet to device 390 and/or device 391.

In another example of operation, processor 330a is configured to generate the OFDM packet to include a short training field (STF) that is adjacently followed by a long training field (LTF) that is adjacently followed by the SIG that is adjacently followed by the copy of the SIG that is adjacently followed by another SIG. In some examples, the STF, the LTF, and the SIG are based on the first communication protocol, and the other SIG is based on the second communication protocol that is different than the first communication protocol. In another example of operation, processor 330a is configured to generate the OFDM packet to include a preamble followed by data. In some examples, a first portion of the preamble is based on the first communication protocol and includes the SIG that is adjacently followed by the copy of the SIG, and a second portion of the preamble is based on the second communication protocol. In another example of operation, processor 330a is configured to generate the OFDM packet including to encode information using a binary convolutional code (BCC) to generate encoded information and to modulate the encoded information using binary phase shift keying (BPSK) modulation to generate the SIG. In another example of operation, processor 330a is configured to generate the OFDM packet including to multiply another SIG by a Pseudo-Noise (PN) sequence to generate the SIG.

In even another example of operation, processor 330a is configured to generate an OFDM packet that includes a short training field (STF) that is adjacently followed by a long training field (LTF) that is adjacently followed by a first signal field (SIG) that is adjacently followed by a copy of the first SIG that is adjacently followed by a second SIG. In some examples, the STF, the LTF, and the first SIG are based on a first communication protocol, and the second SIG is based on a second communication protocol that is different than the first communication protocol. The processor 330a is also configured to transmit the OFDM packet to device 390 and/or device 391.

FIG. 3B is a diagram illustrating another example 302 of communication between wireless communication devices. In an example of operation, on the left hand side (LHS) of the diagram, device 310 is configured to transmit one or more OFDM/A packets to one or more other devices 390 through 391. In the LHS of this diagram, these transmissions are depicted as being performed in a downstream (DS) pathway at or during a first time or time period (e.g., time 1 or ΔT1). In some examples, the device 310 may be configured to transmit such OFDM/A packets using orthogonal frequency division multiple access (OFDMA) signaling and/or multi-user multiple-input-multiple-output (MU-MIMO) signaling, etc.

On the right hand side (RHS) of the diagram, device 310 is configured to receive one or more OFDM/A packets from one or more other devices 390 through 391. In the RHS of this diagram, these transmissions are depicted as being performed in an upstream (US) pathway at or during a second time or time period (e.g., time 2 or ΔT2). In some examples, the device 310 may be configured to receive such OFDM/A packets via OFDMA signaling and/or MU-MIMO signaling, etc.

Note that the OFDM/A packets transmitted, received, etc. between devices may be implemented to include a SIG that is adjacently followed by another SIG. The use of such repeated SIGs can provide for many advantages including robustness, classification, differentiation, etc. of OFDM/A packets of one packet format compared to OFDM/A packets of another packet format. Also, the inclusion of such features within OFDM/A packets allows for them to be classified, differentiated, etc. from OFDM/A packets of other packet formats.

FIG. 3C is a diagram illustrating another example 303 of communication between wireless communication devices. This diagram shows a possible construction of an OFDM packet. The OFDM packet includes a first at least one SIG followed by a second at least one SIG that is followed by one or more other fields within the OFDM packet remainder (e.g., such other fields may include any one or more of an short training field (STF), an long training field (LTF), another SIG such as SIG-A and/or SIB-B based on a newer or newest IEEE 802.11, data, payload, etc.). Note also that the first at least one SIG may be preceded by one or more other fields within the OFDM packet (e.g., STF, LTF, etc.).

In some examples, note that the second at least one SIG is a copy, repeat, duplicate, etc. of the first at least one SIG. In one example, the OFDM packet includes a first SIG that is adjacently followed by a second SIG that is copy, repeat, duplicate, etc. of the first SIG (shown as R-SIG). Note that such a SIG that is adjacently followed by a R-SIG may be viewed as being a SPECIAL symbol. Such a SPECIAL symbol may be used to classify a first symbol, signal, packet, an OFDM packet, etc. based on a first format (e.g., a new format such as a newer or newest IEEE 802.11) vs. one or more previous formats (e.g., a second communication protocol being any prior, legacy, etc. version of IEEE 802.11 relative to the newer or newest IEEE 802.11).

In some examples, such a SPECIAL symbol may be designed to be up to a particular length (e.g., 8 μs (microseconds) long). In some examples, the SPECIAL format can contain any specific pseudo-noise (PN) sequence (e.g., may be multiplied by a PN sequence) and can be used instead of another field (e.g., such as besides a STF). The SPECIAL symbol can also be a repeated L_SIG field (e.g., such as a legacy SIG based on a legacy, prior, etc. IEEE 802.11 communication protocol relative to a newer or newest IEEE 802.11 communication protocol). Note that a double guard interval (GI) can be used in front of such a SIG field within such an OFDM/A packet.

Such SIGs (e.g., SIG that is adjacently followed by R-SIG) can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. Among other aspects, this disclosure presents a means by which an OFDM/A packet is designed that includes such SIGs (e.g., SIG that is adjacently followed by R-SIG).

Note also that a first at least one SIG can include a SIG and a copy of that SIG (or a cyclic shifted copy of that SIG, R-SIG) the second at least one SIG can include as few as one SIG or two or more SIGs. In some examples, the first at least one SIG specifies one or more characteristics of the second at least one SIG. In some examples, information included within one or both of the first and second at least one SIGs specifies one or more other characteristics of the OFDM packet remainder. Some additional information regarding orthogonal frequency division multiplexing (OFDM) and/or orthogonal frequency division multiple access (OFDMA) is provided below.

Note also that various portions of the OFDM/A packet may be based on different communication protocol. In one example, the SIG and its copy, duplicate, etc. R-SIG are based on a first communication protocol, and at least one other field of the OFDM/A packet is based on a second communication protocol that is different than the first communication protocol. In some examples, the first communication protocol is a first IEEE 802.11 communication protocol, and the second communication protocol is a second IEEE 802.11 communication protocol that is a legacy IEEE 802.11 communication protocol version to the first IEEE 802.11 communication protocol. For example, the second IEEE 802.11 communication protocol may be based on IEEE 802.11ax, while the first IEEE 802.11 communication protocol may be based on any prior/legacy version relative to IEEE 802.11ax (e.g., IEEE 802.11a, IEEE 802.11b, IEEE 802.11g, IEEE 802.11n, IEEE 802.11ac, IEEE 802.11ah, IEEE 802.11ag, and/or any other prior/legacy version, etc.).

Figure 4:
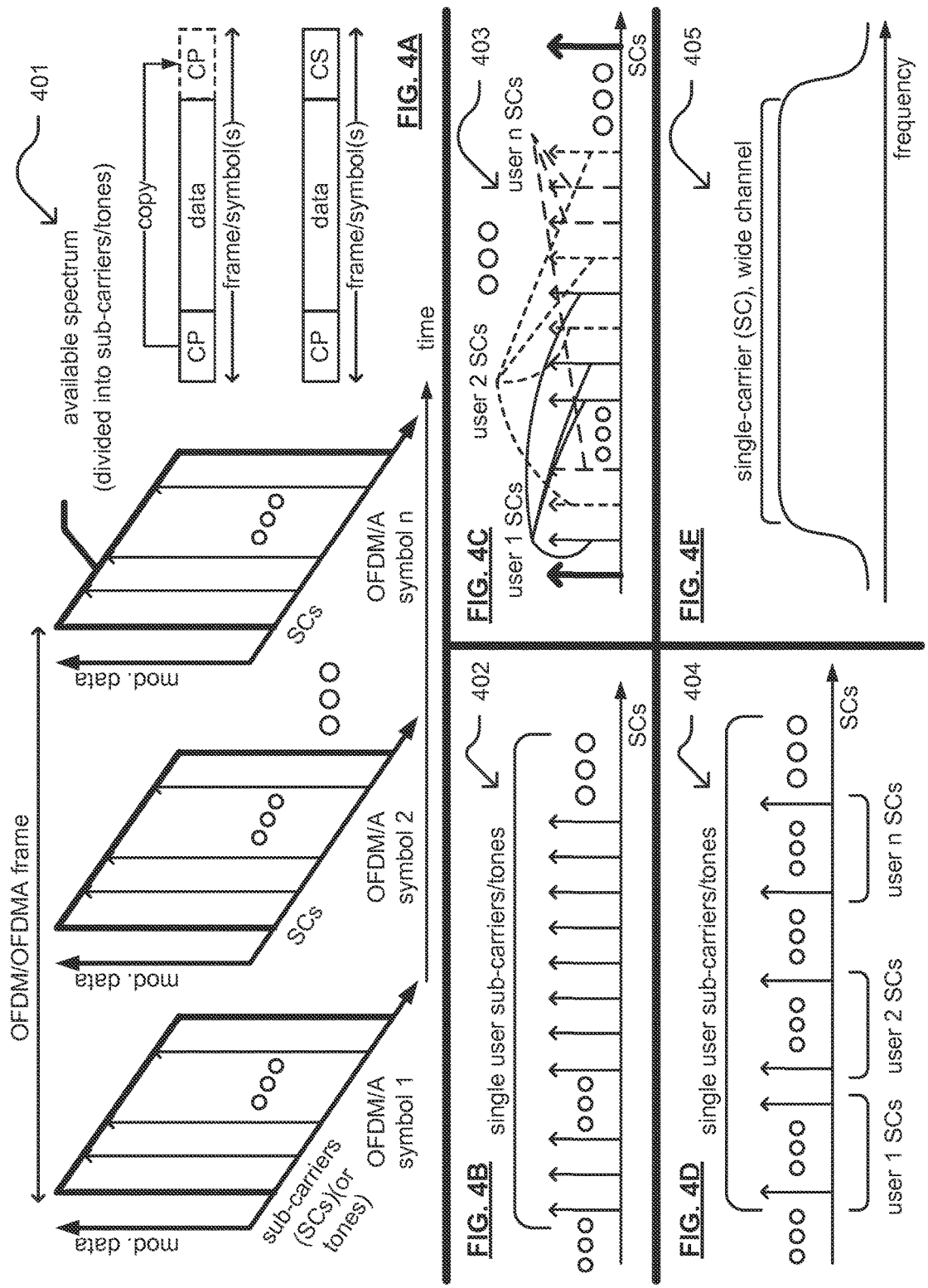
FIG. 4A is a diagram illustrating an example of orthogonal frequency division multiplexing (OFDM) and/or orthogonal frequency division multiple access (OFDMA).
FIG. 4B is a diagram illustrating another example of OFDM and/or OFDMA.
FIG. 4C is a diagram illustrating another example of OFDM and/or OFDMA.
FIG. 4D is a diagram illustrating another example of OFDM and/or OFDMA.
FIG. 4E is a diagram illustrating an example of single-carrier (SC) signaling.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 4A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 4E is a diagram illustrating an example 405 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface (or alternatively a processor, such a processor 330a shown in FIG. 3A) configured to process received OFDM and/or OFDMA symbols and/or frames (and/or SC symbols and/or frames) and to generate such OFDM and/or OFDMA symbols and/or frames (and/or SC symbols and/or frames).

In an example of operation, a communication device (e.g., such as any of the wireless communication devices described herein or their equivalents) is configured to generate an OFDM/A symbol, an OFDM/A frame, an OFDM/A packet, an OFDM/A super-frame, and/or another signal having certain characteristics. Examples of such characteristics include having a field and a repetition, copy, duplicate, etc. of that field therein.

Other examples of such characteristics include field content. Consider having a given field to include first content in one instance (e.g., to specify one symbol, packet, frame, signal, etc. type) and to include second content in one instance (e.g., to specify another symbol, packet, frame, signal, etc. type). For example, content of a first type can be used to specify a first symbol, packet, frame, signal, etc. type, and content of a second type can be used to specify a second symbol, packet, frame, signal, etc. type. Generally, this process can continue for any number of symbol, packet, frame, signal, etc. types such that content of an n-th type (n being a positive integer greater than 1) can be used to specify an n-th symbol, packet, frame, signal, etc. type.

Other examples of such characteristics include inverted polarity. Consider having two fields that have some inverted polarity with respect to one another. For example, a first field may have a first phase, and a second field may have a second phase that is an inverted polarity relative the first phase. In one example, the first phase is 0 degrees and the second phase is 180 degrees. Note that in some instances the two fields may have the same phase (e.g., both 0 degrees, both 180 degrees, etc.) as yet another means by which to differentiate the fields.

Other examples of such characteristics include phase shifts, rotations, etc. Consider having two fields that have some phase shift, rotation, etc. with respect to one another. For example, a first field may have a first phase, and a second field may have a second phase that is different than the first phase. In one example, the first phase is 0 degrees and the second phase is 90 degrees. Note that in some instances the two fields may have the same phase (e.g., both 0 degrees, both 90 degrees, etc.) as yet another means by which to differentiate the fields.

In prior IEEE 802.11 legacy prior standards, protocols, and/or recommended practices, including those that operate in the 2.4 GHz and 5 GHz frequency bands, among other frequency bands, certain preambles are used. For use in the development of a new standard, protocol, and/or recommended practice, a new preamble design is presented herein that permits classification of all current preamble formats while still enabling the classification of a new format by new devices.

Figure 5:
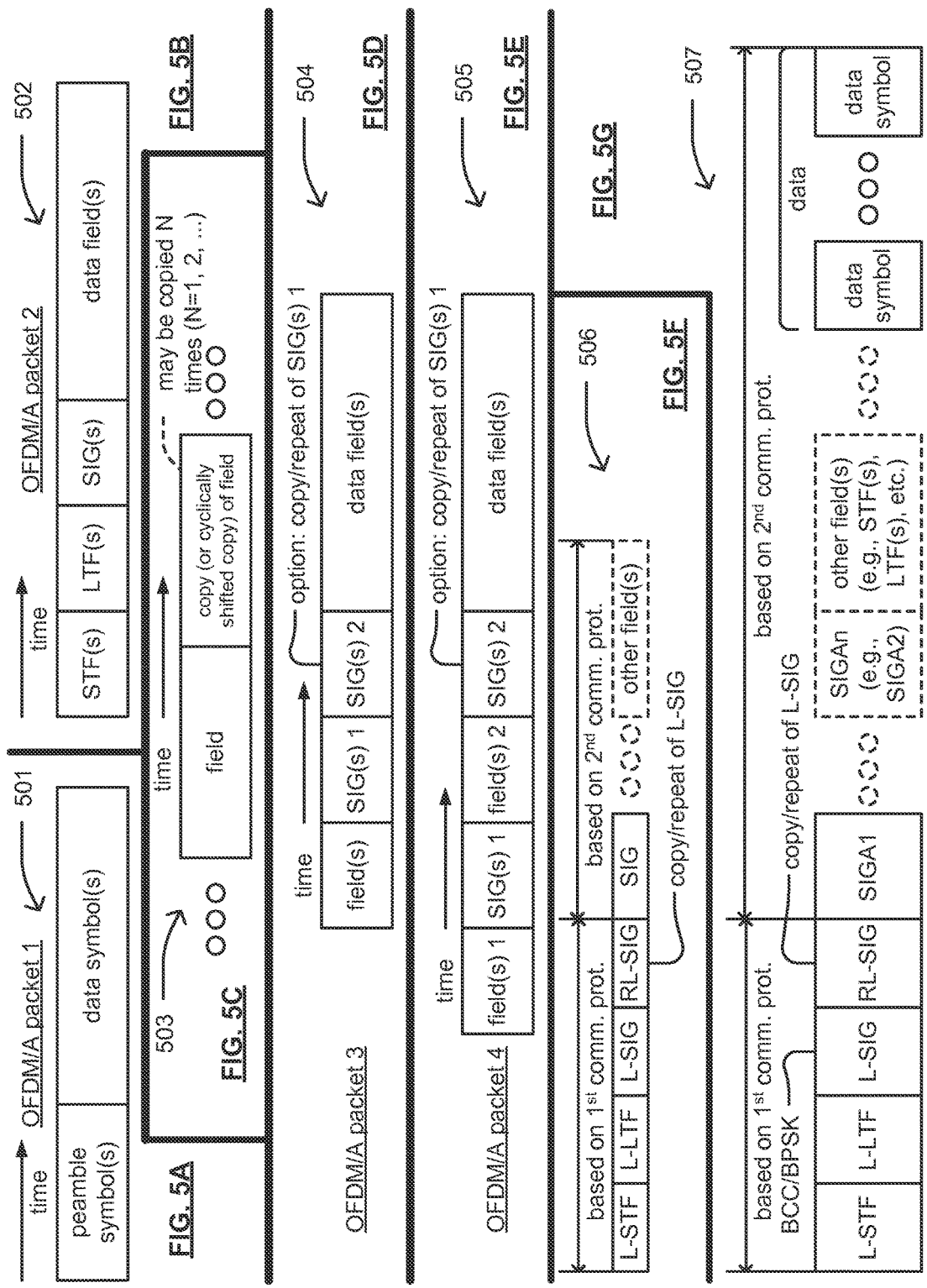
FIG. 5A is a diagram illustrating an example of an OFDM/A packet.
FIG. 5B is a diagram illustrating another example of an OFDM/A packet of a second type.
FIG. 5C is a diagram illustrating an example of at least one portion of an OFDM/A packet of another type.
FIG. 5D is a diagram illustrating another example of an OFDM/A packet of a third type.
FIG. 5E is a diagram illustrating another example of an OFDM/A packet of a fourth type.
FIG. 5F is a diagram illustrating another example of an OFDM/A packet.
FIG. 5G is a diagram illustrating another example of an OFDM/A packet.

FIG. 5A is a diagram illustrating an example 501 of an OFDM/A packet. This packet includes at least one preamble symbol followed by at least one data symbol. The at least one preamble symbol includes information for use in identifying, classifying, and/or categorizing the packet for appropriate processing.

FIG. 5B is a diagram illustrating another example 502 of an OFDM/A packet of a second type. This packet also includes a preamble and data. The preamble is composed of and/or short training field (STF), at least one long training field (LTF), and at least one signal field (SIG). The data is composed of at least one data field. In both this example 502 and the prior example 501, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 5C is a diagram illustrating another example 503 of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 5D is a diagram illustrating another example 504 of an OFDM/A packet of a third type. In this example 504, the OFDM/A packet includes one or more fields followed by one of more first signal fields (SIG(s) 1) followed by one of more second signal fields (SIG(s) 2) followed by and one or more data field.

FIG. 5E is a diagram illustrating another example 505 of an OFDM/A packet of a fourth type. In this example 505, the OFDM/A packet includes one or more first fields followed by one of more first signal fields (SIG(s) 1) followed by one or more second fields followed by one of more second signal fields (SIG(s) 2) followed by and one or more data field.

FIG. 5F is a diagram illustrating another example 506 of an OFDM/A packet. Such a general preamble format may be backward compatible with prior IEEE 802.11 prior standards, protocols, and/or recommended practices.

In this example 506, the OFDM/A packet includes a legacy portion (e.g., at least one legacy short training field (STF) shown as L-STF, at least one legacy long training field (LTF) shown as L-LTF, a legacy signal field (SIG) shown as L-SIG, and a repeat, copy, duplicate, etc. of that shown as L-SIG shown as RL-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

FIG. 5G is a diagram illustrating another example 507 of an OFDM/A packet. In this example 507, the OFDM/A packet includes a first portion based on a first communication protocol and a second portion based on a second communication protocol. Generally, note that other types of OFDM/A packets may generally include a first portion based on a first communication protocol, a second portion based on a second communication protocol, and so on up to an n-th portion based on an n-th communication, where n is a positive integer greater than 2.

Considering the example 507 of this diagram, a first portion of the OFDM/A packet based on a first communication protocol (e.g., a legacy portion) includes a legacy STF shown as L-STF, a legacy LTF shown as L-LTF, a legacy SIG shown as L-SIG, a repetition of the legacy SIG shown as RL-SIG) followed by a second portion of the OFDM/A packet that is based on a second communication protocol that includes a first other SIG shown as SIGA1 and optionally one or more other SIGs (e.g., a SIGA2 or alternatively up to a SIGAn). In some examples, the OFDM/A packet also includes one or more other fields (e.g., one or more other STFs, one or more other LTFs, etc.). In some examples, the OFDM/A packet also includes one or more data symbols.

Note also that any one or more portions of the various examples of OFDM/A packets, portions thereof, etc. may selected and combined to form other types of OFDM/A packets, portions thereof, etc. For examples, certain portions or aspects of any OFDM/A packets, portions thereof, etc. may be selected and used to design, construct, generate, etc. various other OFDM/A packets, portions thereof, etc.

Figure 6:
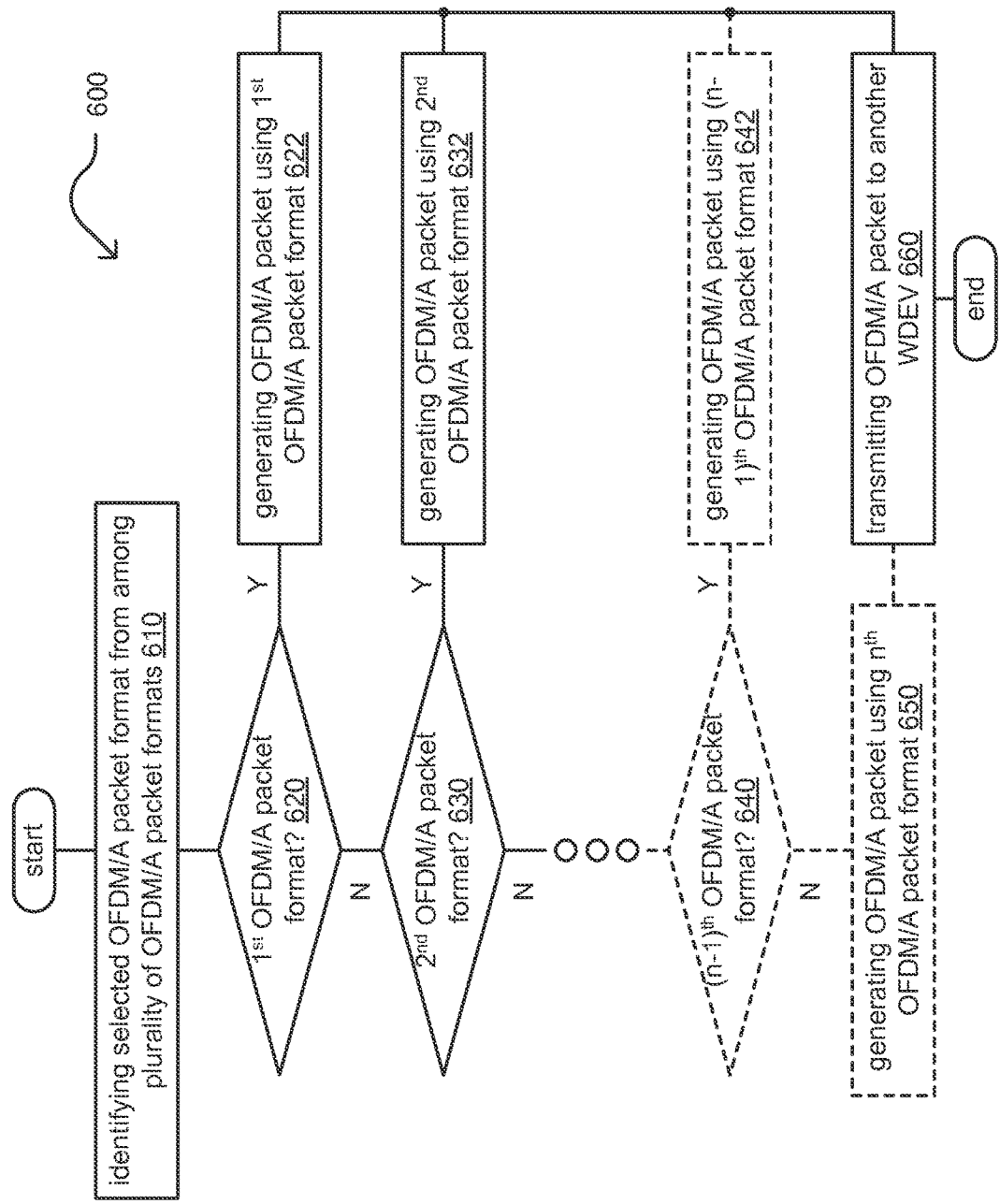
FIG. 6 is a diagram illustrating an embodiment of a method for execution by one or more wireless communication devices.

FIG. 6 is a diagram illustrating an embodiment of a method 600 for execution by one or more wireless communication devices. The method 600 begins by identifying a selected OFDM/A packet format among a plurality of OFDM/A packet formats (block 610). When a first OFDM/A packet format is determined to be selected (decision block 620), the method 600 continues by generating an OFDM/A using the first OFDM/A packet format (block 622). When a second OFDM/A packet format is determined to be selected (decision block 630), the method 600 continues by generating an OFDM/A using the second OFDM/A packet format (block 632). This process continues up until an (n−1)th OFDM/A packet format. When an (n−1)th OFDM/A packet format is determined to be selected (decision block 630), the method 600 continues by generating an OFDM/A using the an (n−1)th OFDM/A packet format (block 642).

Then, if it is determined that the selected OFDM/A packet format is none of the first OFDM/A packet format, the second OFDM/A packet format, and so on up to the (n−1)th OFDM/A packet format, then the method 600 continues by generating an OFDM/A packet using the an nth OFDM/A packet format (block 650), which is the only possible remaining OFDM/A packet format among the plurality of OFDM/A packet formats. Then, once the OFDM/A packet is generated using the selected OFDM/A packet format, the method 600 continues by transmitting the OFDM/A packet to another wireless communication device (WDEV) (block 660).

Figure 7:
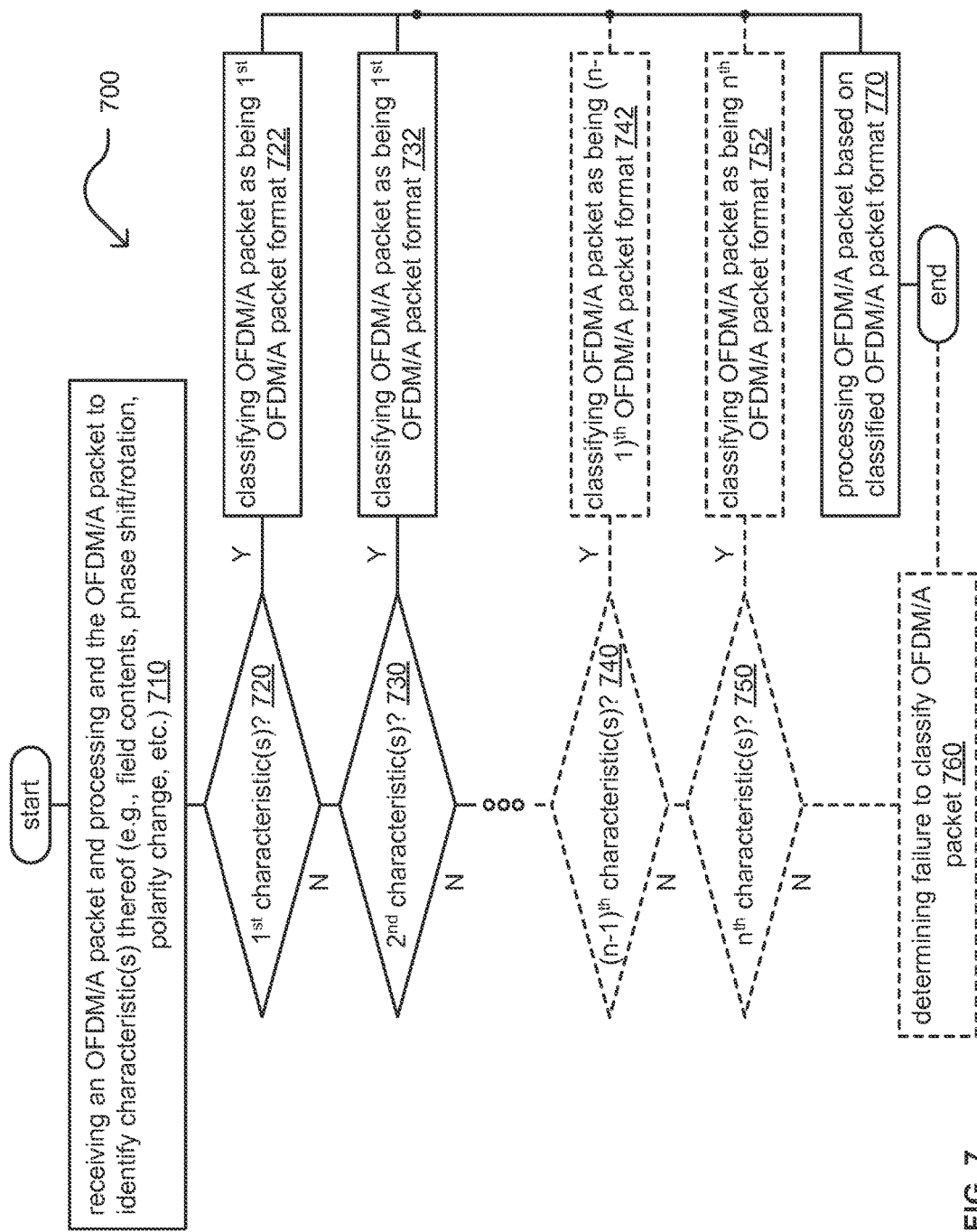
FIG. 7 is a diagram illustrating another embodiment of a method for execution by one or more wireless communication devices.

FIG. 7 is a diagram illustrating another embodiment of a method 700 for execution by one or more wireless communication devices. The method 700 begins by receiving an OFDM/A packet and processing the OFDM/A packet to identify one or more characteristics thereof (block 710). Examples of such characteristics can include any one or more of field content, phase shift/rotation, polarity change, etc. among various one or more fields of the OFDM/A packet.

When first one or more characteristics are determined to be part of the OFDM/A packet (decision block 720), the method 700 continues by classifying the OFDM/A packet as having a first OFDM/A packet format (block 722). When second one or more characteristics are determined to be part of the OFDM/A packet (decision block 730), the method 700 continues by classifying the OFDM/A packet as having a second OFDM/A packet format (block 732).

In some examples, the this process continues considering an (n−1)th characteristics corresponding to an (n−1)th OFDM/A packet format. For example, when (n−1)th one or more characteristics are determined to be part of the OFDM/A packet (decision block 740), the method 700 continues by classifying the OFDM/A packet as having an (n−1)th OFDM/A packet format (block 742). When nth one or more characteristics are determined to be part of the OFDM/A packet (decision block 750), the method 700 continues by classifying the OFDM/A packet as having an nth OFDM/A packet format (block 752).

When none of the various characteristics are determined to be part of the OFDM/A packet, the method 700 continues by determining a failure to classify the OFDM/A as having any known OFDM/A packet format (block 760). When the OFDM/A packet has been classified as having a known OFDM/A packet format, the method 700 continues by processing the OFDM/A packet based on the classified OFDM/A packet format (block 770).

FIG. 8A is a diagram illustrating an embodiment of a method 801 for execution by one or more wireless communication devices. The method 801 begins by generating an OFDM/A packet that includes a signal field (SIG) and a copy of that SIG (block 810). The method 801 continues by transmitting the OFDM/A packet to another wireless communication device (WDEV) (block 820).

FIG. 8B is a diagram illustrating another embodiment of a method 802 for execution by one or more wireless communication devices. The method 802 begins by generating an OFDM/A packet that includes a first signal field (SIG) that is adjacently followed by a copy of that first SIG that is adjacently followed by a second SIG (block 811). For example, the first SIG may be based on a first communication protocol, and the second SIG may be based on a second communication protocol. The method 802 continues by transmitting the OFDM/A packet to another wireless communication device (WDEV) (block 821).

FIG. 8C is a diagram illustrating another embodiment of a method 803 for execution by one or more wireless communication devices. The method 803 begins by receiving an OFDM/A packet that includes a SIG and a copy of that SIG from another wireless communication device (WDEV) (block 812). The method 803 continues by processing the OFDM/A packet including processing the SIG and/or the copy of that SIG for one or more purposes (block 822). Examples of such processing include for classification, for determination of one or more parameters for one or more other portions of the OFDM/A packet, etc.

FIG. 8D is a diagram illustrating another embodiment of a method 804 for execution by one or more wireless communication devices. The method 804 begins by receiving an OFDM/A packet that includes a first signal field (SIG) that is adjacently followed by a copy of that first SIG that is adjacently followed by a second SIG from another wireless communication device (WDEV) (block 813).

The method 804 continues by continues by processing the OFDM/A packet including processing the first SIG and/or the copy of that first SIG and/or the second SIG for one or more purposes (block 823). Examples of such processing include for classification, for determination of one or more parameters for one or more other portions of the OFDM/A packet, etc.

It is noted that the various operations and functions described within various methods herein may be performed within a wireless communication device (e.g., such as by the processor 330, communication interface 320, and memory 340 or processor 330a such as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a processor configured to:
generate an orthogonal frequency division multiplexing (OFDM) packet that includes, based on time, a signal field (SIG) that is adjacently followed by a copy of the SIG that is adjacently followed by at least one other field, wherein the SIG is based on a first communication protocol, and wherein the at least one other field is based on a second communication protocol that is different than the first communication protocol; and transmit the OFDM packet to another wireless communication device.

2. The wireless communication device of claim 1, wherein the processor is further configured to:
generate the OFDM packet to include a short training field (STF) that is adjacently followed by a long training field (LTF) that is adjacently followed by the SIG that is adjacently followed by the copy of the SIG that is adjacently followed by another SIG, wherein the STF, the LTF, and the SIG are based on the first communication protocol, and wherein the another SIG is based on the second communication protocol that is different than the first communication protocol.

3. The wireless communication device of claim 1, wherein the processor is further configured to:
generate the OFDM packet to include a preamble followed by data, wherein a first portion of the preamble is based on the first communication protocol and includes the SIG that is adjacently followed by the copy of the SIG, and wherein a second portion of the preamble is based on the second communication protocol.

4. The wireless communication device of claim 1, wherein the processor is further configured to:
generate the OFDM packet including to encode information using a binary convolutional code (BCC) to generate encoded information and to modulate the encoded information using binary phase shift keying (BPSK) modulation to generate the SIG.

5. The wireless communication device of claim 1, wherein the processor is further configured to:
generate the OFDM packet including to multiply another SIG by a Pseudo-Noise (PN) sequence to generate the SIG.

6. The wireless communication device of claim 1 further comprising:
a communication interface, the processor and the communication interface configured to transmit the OFDM packet to the another wireless communication device, wherein:
the first communication protocol is a first IEEE 802.11 communication protocol; and
the second communication protocol is a second IEEE 802.11 communication protocol that is a legacy IEEE 802.11 communication protocol version to the first IEEE 802.11 communication protocol.

7. The wireless communication device of claim 1 further comprising:
an access point (AP), wherein the another wireless communication device includes a wireless station (STA).

8. The wireless communication device of claim 1 further comprising:
a wireless station (STA), wherein the another wireless communication device includes an access point (AP).

9. A wireless communication device comprising:
a processor configured to:
generate an orthogonal frequency division multiplexing (OFDM) packet that includes, based on time, a short training field (STF) that is adjacently followed by a long training field (LTF) that is adjacently followed by a first signal field (SIG) that is adjacently followed by a copy of the first SIG that is adjacently followed by a second SIG, wherein the STF, the LTF, and the first SIG are based on a first communication protocol, and wherein the second SIG is based on a second communication protocol that is different than the first communication protocol; and transmit the OFDM packet to another wireless communication device.

10. The wireless communication device of claim 9, wherein the processor is further configured to:
generate the OFDM packet including to encode information using a binary convolutional code (BCC) to generate encoded information and to modulate the encoded information using binary phase shift keying (BPSK) modulation to generate the first SIG.

11. The wireless communication device of claim 9, wherein the processor is further configured to:
generate the OFDM packet including to multiply another SIG by a Pseudo-Noise (PN) sequence to generate the first SIG.

12. The wireless communication device of claim 9 further comprising:
an access point (AP), wherein the another wireless communication device includes a wireless station (STA).

13. The wireless communication device of claim 9 further comprising:
a wireless station (STA), wherein the another wireless communication device includes an access point (AP).

14. A method for execution by a wireless communication device, the method comprising:
generating an orthogonal frequency division multiplexing (OFDM) packet that includes, based on time, a signal field (SIG) that is adjacently followed by a copy of the SIG that is adjacently followed by at least one other field, wherein the SIG is based on a first communication protocol, and the at least one other field is based on a second communication protocol that is different than the first communication protocol; and
transmitting, via a communication interface of the wireless communication device, the OFDM packet to another wireless communication device.

15. The method of claim 14 further comprising:
generating the OFDM packet to include a short training field (STF) that is adjacently followed by a long training field (LTF) that is adjacently followed by the SIG that is adjacently followed by the copy of the SIG that is adjacently followed by another SIG, wherein the STF, the LTF, and the SIG are based on the first communication protocol, and wherein the another SIG is based on the second communication protocol that is different than the first communication protocol.

16. The method of claim 14 further comprising:
generating the OFDM packet to include a preamble followed by data, wherein a first portion of the preamble is based on the first communication protocol and includes the SIG that is adjacently followed by the copy of the SIG, and wherein a second portion of the preamble is based on the second communication protocol.

17. The method of claim 14 further comprising:
generating the OFDM packet including to encode information using a binary convolutional code (BCC) to generate encoded information and to modulate the encoded information using binary phase shift keying (BPSK) modulation to generate the SIG.

18. The method of claim 14 further comprising:
generating the OFDM packet including to multiply another SIG by a Pseudo-Noise (PN) sequence to generate the SIG.

19. The method of claim 14, wherein:
the first communication protocol is a first IEEE 802.11 communication protocol; and
the second communication protocol is a second IEEE 802.11 communication protocol that is a legacy IEEE 802.11 communication protocol version to the first IEEE 802.11 communication protocol.

20. The method of claim 14, wherein the wireless communication device includes a wireless station (STA), and the another wireless communication device includes an access point (AP).

* * * * *